US009304323B2

(12) United States Patent
Khrushchev

(10) Patent No.: US 9,304,323 B2
(45) Date of Patent: Apr. 5, 2016

(54) PROJECTION DEVICE AND METHOD FOR OPERATING A PROJECTION DEVICE

(71) Applicant: OSRAM GmbH, Munich (DE)

(72) Inventor: Sergey Khrushchev, Regensburg (DE)

(73) Assignee: OSRAM GmbH, Munich (DE)

( * ) Notice: Subject to any disclaimer, the term of this patent is extended or adjusted under 35 U.S.C. 154(b) by 78 days.

(21) Appl. No.: 14/371,740

(22) PCT Filed: Jan. 8, 2013

(86) PCT No.: PCT/EP2013/050227
§ 371 (c)(1),
(2) Date: Jul. 11, 2014

(87) PCT Pub. No.: WO2013/104628
PCT Pub. Date: Jul. 18, 2013

(65) Prior Publication Data
US 2014/0375956 A1  Dec. 25, 2014

(30) Foreign Application Priority Data

Jan. 12, 2012  (DE) .......................... 10 2012 200 407

(51) Int. Cl.
*G03B 21/00* (2006.01)
*G02B 27/26* (2006.01)
(Continued)

(52) U.S. Cl.
CPC .............. *G02B 27/26* (2013.01); *G02B 27/283* (2013.01); *G02B 27/285* (2013.01); *G03B 21/2033* (2013.01); *G03B 21/2073* (2013.01);
(Continued)

(58) Field of Classification Search
CPC .. G03B 21/208; G03B 21/2073; G02B 27/26; G02B 27/145; G02B 27/283; H04N 9/3105; H04N 9/3167; H04N 9/3197
See application file for complete search history.

(56) References Cited

U.S. PATENT DOCUMENTS 6,570,713 B2   5/2003  Bittenson
2003/0117595 A1  6/2003  Li et al.
(Continued)

FOREIGN PATENT DOCUMENTS

DE    102006010969 A1   9/2007
DE    102011087184 A1   5/2013
(Continued)

OTHER PUBLICATIONS

International Search Report issued in PCT7EP2013/050227 dated Mar. 4, 2013.

*Primary Examiner* — Sultan Chowdhury
(74) *Attorney, Agent, or Firm* — Viering, Jentschura & Partner mbB

(57) ABSTRACT

A projection device may include at least one first laser device and one second laser device, which is arranged opposite the first laser device. A prism is arranged between the two laser devices, wherein a polarization-dependent mirror device is arranged in the prism in such a manner that the beam of the first laser device is reflected in a direction that extends opposite the direction in which the beam of the second laser device is reflected. The polarization of the beam of the second laser device is then rotated, and the beam is deflected back to the polarization-dependent mirror device. The beam of the second laser device now passes through the mirror device without reflection due to the change in the polarization of the beam of the second laser device, such that two superposed laser beams of different polarization are available at the output of the projection device.

21 Claims, 3 Drawing Sheets

(51) Int. Cl.
*H04N 9/31* (2006.01)
*G02B 27/28* (2006.01)
*G03B 21/20* (2006.01)
*G03B 21/28* (2006.01)
*G02B 5/30* (2006.01)

(52) U.S. Cl.
CPC .............. *G03B21/28* (2013.01); *H04N 9/3167* (2013.01); *G02B 5/3083* (2013.01)

(56) References Cited

U.S. PATENT DOCUMENTS

2006/0023172 A1* 2/2006 Ikeda ................. G02B 27/0961 353/94
2008/0174868 A1 7/2008 Schuck et al.
2009/0059172 A1 3/2009 Hsu et al.
2010/0110386 A1 5/2010 Handschy et al.
2011/0273770 A1 11/2011 Poon et al.
2013/0063701 A1* 3/2013 Ouderkirk .......... G03B 21/2033 353/20
2013/0076995 A1 3/2013 Huang et al.

FOREIGN PATENT DOCUMENTS

| EP | 1235314 A2 | 8/2002 |
| WO | 2007101605 A1 | 9/2007 |
| WO | 2011153801 A1 | 12/2011 |
| WO | 2013079241 A1 | 6/2013 |

* cited by examiner

PROJECTION DEVICE AND METHOD FOR OPERATING A PROJECTION DEVICE

RELATED APPLICATIONS

The present application is a national stage entry according to 35 U.S.C. §371 of PCT application No.: PCT/EP2013/050227 filed on Jan. 8, 2013, which claims priority from German application No.: 10 2012 200 407.6 filed on Jan. 12, 2012, and is incorporated herein by reference in its entirety.

TECHNICAL FIELD

Various embodiments relate to a projection device including at least one first laser device for emitting a first radiation having a first direction of polarization and at least one second laser device for emitting a second radiation having the first direction of polarization. Moreover, various embodiments relate to a method for operating such a projection device.

BACKGROUND

One of the major challenges in image projection is the representation of three-dimensional images by means of stereoscopic methods. In this case, the left and right eyes are intended to perceive different images. Overall, such a projection device is intended to be cost-effective to realize and to be distinguished by high robustness. Particularly in the case of so-called pico-projectors, therefore, 3D projection can be realized only with difficulty. Pico-projectors are required in particular for incorporation into cellular phones and other mobile telecommunication devices.

Known 3D projection methods use special spectacles for this purpose. In this regard, so-called shutter spectacles are used, for example, wherein the images of the two channels, that is to say of the channel for the right eye and of the channel for the left eye, are represented alternately on the projection surface and in addition, the left eye and respectively the right eye are alternately shaded in a manner synchronized with the image projection. However, flicker phenomena can very easily occur here if the image frequency is too low. Moreover, such spectacles require a dedicated power supply.

In a second known method, different polarization filters are applied on the two spectacle lenses in order to filter the respective light channel. In the linear polarization method, the two polarization filters used have a crossed polarization axis, that is to say that the two directions of polarization are perpendicular to one another; in the circular polarization method, the polarizations of the two spectacle lenses are in opposite directions. In this regard, the image information for each eye can be defined solely by way of the polarization. As a result, in principle, two images can be represented simultaneously and the probability of flicker effects is equal to zero. In the related art, such a method is used in cinema projection, for example. Two projectors each having at least one discharge lamp are usually used in this case. A corresponding polarization filter is placed in front of each projector. Such a method takes up a great deal of space and therefore cannot be used in small projectors, for example for cellular phones and other mobile communication devices.

With regard to the related art, reference is furthermore made to the subsequently published German application in the name of the same applicant as the present application, application no 10 2011 087 184.5, which proposes a projection device illustrated in FIG. 1. Such a projection device 10 includes six laser diodes 12, for example. In this case, laser diodes 12 which emit a radiation in the same wavelength range are respectively arranged opposite one another. In the present case, the laser diodes $12_{B1}$ and $12_{B2}$ emit radiation in the blue wavelength range, the laser diodes $12_{G1}$ and $12_{G2}$ emit radiation in the green wavelength range, and the laser diodes $12_{R1}$ and $12_{R2}$ emit radiation in the red wavelength range. A lens $14_{B1}$ to $14_{R2}$ is assigned to each laser diode $12_{B1}$ to $12_{R2}$. A prism 16 is arranged between the respective opposite laser diodes 12. Said prism in the present case includes three polarization-dependent and wavelength-dependent mirror devices 18, wherein a first $18_B$ is arranged between the laser diodes $12_{B1}$ and $12_{B2}$, a second $18_G$ is arranged between the laser diodes $12_{G1}$ and $12_{G2}$, and a third $18_R$ is arranged between the laser diodes $12_{R1}$ and $12_{R2}$. The respective wavelength-dependent, polarization-dependent mirror device forms an angle of $\alpha=45°$ with the connecting line between the respective laser diodes.

In the example illustrated, the radiation emitted by the respective laser diodes 12 is s-polarized. In the example illustrated, the wavelength-dependent, polarization-dependent mirror devices 18 are designed to reflect s-polarized radiation and to allow p-polarized radiation to pass through. In the respective polarization-dependent mirror device 18, this effect occurs only in a wavelength range provided for this. Radiation of other wavelengths can pass through the wavelength-dependent, polarization-dependent mirror device 18 substantially without reflection, i.e. apart from unavoidable minimal losses.

After reflection at the respective mirror device 18, radiation emitted by the laser diodes having the index "2" is accordingly reflected in the direction of the output A of the projection device. By contrast, radiation from the laser diodes having the index "1" is reflected in a direction opposite thereto by 180°, to be precise in the direction of a λ/4 retardation plate 20. The respective radiation penetrates through the λ/4 retardation plate 20 and impinges on a mirror device 22 designed to reflect all radiation in the three wavelength ranges indicated. After reflection at the mirror device 22, the radiation passes through the λ/4 retardation plate 20 again. On account of passing through the λ/4 retardation plate 20 twice, the direction of polarization has changed from "s" to "p". The now p-polarized radiation enters into the prism 16 again, wherein the radiation can now pass through the wavelength-dependent, polarization-dependent mirror devices 18 in an unimpeded manner, on account of its p-polarization, in the direction of the output A.

Accordingly, at the output A, a laser beam is available in which s- and p-polarized laser beams are superimposed relative to the respective wavelength range. At the output A, a so-called micromirror arrangement, for example an MEMS arrangement (MEMS=MicroElectroMechanical System) can be provided in order to project the cumulative radiation onto a projection surface. A user who views the projection surface and who wears cross-polarized filter spectacles can perceive a colored 3D representation.

Even though three pairs of laser diodes opposite one another were used in the example illustrated, the concept can also be realized with only one pair of laser diodes opposite one another or even a larger number of laser diodes opposite one another. Equally, the radiation emitted by the laser diodes can be p-polarized, such that its polarization axis is rotated by 90° after passing through the λ/4 retardation plate twice. The previously p-polarized radiation is now s-polarized. The same result as with the example illustrated in FIG. 1 can thus be achieved. Furthermore, other ways of modifying the polarization are possible instead of the λ/4 retardation plate, for example 3λ/4 retardation plates and the like.

In accordance with another exemplary realization, the two laser diodes arranged opposite one another can be laterally offset, that is to say not arranged on a common axis. Mutual influencing of the laser diodes can largely be precluded as a result. The λ/4 retardation plate can be applied directly on the prism. The mirror device can be embodied as a prism having a reflectively coated outer surface, wherein the prism can be applied directly on the λ/4 retardation plate. By virtue of a suitable choice of the angles of the prism, it is possible, in this respect see FIG. 2 of the application in the name of the present applicant filed under the internal file reference 201117170, for the respective beams to be superimposed and provided in this superimposed form at the output A. It goes without saying that such an example can also be extended by further pairs of laser devices.

Generally, that is to say independently of the realization chosen, the following can be noted: the respective laser devices can emit their radiation simultaneously. Alternatively or supplementarily thereto, the laser devices can also emit their radiation in a sequentially time-shifted manner for example with a predefinable clock rate.

The retardation plate can also be attached to the prism without any spacing, that is to say directly. Instead of a plate-type structure, it is also possible to use a retardation film, for example a λ/4 retardation film having a thickness of approximately 50 μm.

The mirror device can be configured as a highly reflective mirror and can be arranged at a distance from the retardation plate, or can be applied or fitted for example as a highly reflective coating directly on that side of the retardation plate which faces away from the laser devices.

The mirror device can also be configured as a prism.

The laser devices are not restricted to the use of laser diodes. Rather, they can encompass all types of polarized laser light sources, that is to say in particular including gas lasers, solid-state lasers or fiber lasers.

The inventors of the present application have ascertained that unstable operation of the laser diodes involved can occur in realizations of the projection devices mentioned.

SUMMARY

Various embodiments provide a projection device mentioned in the introduction and a method mentioned in the introduction in such a way that the representation of 3-dimensional images is made possible even in very small projections, in particular pico-projectors. With regard to the projection devices, presented in the application filed with the application number 10 2011 087 184.5 at the German Patent and Trademark Office, the object is to develop the projection devices presented therein and the method presented therein in such a way that operation of the laser devices involved that is as stable as possible is made possible.

The present disclosure is based on the insight that unstable operation of the laser devices can occur if the effect known from external cavity resonators occurs in laser-based devices. Very generally, the operating stability of a laser source is an important part of the development of laser projectors. In this case, a laser consists of two mirrors bounding an active medium. Such an arrangement is known by the designation laser resonator (cavity resonator).

Since light is in the form of waves, the formation of standing waves or modes between the mirrors occurs if light is reflected back and forth between the mirrors of the cavity, with the result that the light is superimposed with itself constructively or destructively.

In association with a cavity resonator, a further, external mirror can then be used, which is arranged in the laser beam outside the resonance cavity. This leads to the formation of a standing wave which is superimposed either constructively or destructively with the wave in the laser resonator. If the phase of the light in the external cavity is opposite to the phase of the standing wave in the laser resonator, then a destructive superimposition takes place and the generation of light is disturbed. This results in unstable operation of the laser device.

In order to solve this problem, the inventors of the present disclosure therefore propose using a suitable design to ensure that no back-reflections into the laser cavity resonator occur. Accordingly, in a projection device according to various embodiments, the first laser device and the second laser device are arranged opposite one another, wherein the projection device furthermore includes a prism arranged between the first laser device and the second laser device and having a first boundary surface facing the first laser device and a second boundary surface facing the second laser device. At least one polarization-dependent mirror device is arranged in the prism and is designed in such a way that radiation having the first direction of polarization is reflected after impinging on the polarization-dependent mirror device, wherein the polarization-dependent mirror device is arranged between the first laser device and the second laser device in such a way that the first radiation and the second radiation run oppositely to one another after reflection at the polarization-dependent mirror device. At least one polarization modification device is provided, wherein the polarization modification device is designed to modify the direction of polarization of radiation in such a way that it passes through the polarization-dependent mirror device without reflection. Moreover, at least one further mirror device is provided. The polarization modification device and the further mirror device are arranged in the beam path of the second radiation after a first and before a second impingement on the polarization-dependent mirror device. According to various embodiments, it is provided that the first boundary surface of the prism forms a predefinable angle not equal to 90° with the optical axis of the first laser device and the second boundary surface of the prism runs parallel to the first boundary surface. In other words, the first boundary surface and the second boundary surface are inclined.

A back-reflection of a collimated beam into the laser cavity resonator is prevented as a result of this measure. Disturbances can thereby be reliably avoided, which results in extremely stable laser operation.

In one preferred embodiment, the prism has a third boundary surface, which faces the polarization modification device and the further mirror device, and also a fourth boundary surface which constitutes the output of the projection device.

Proceeding therefrom, two particularly preferred embodiments can be configured as follows:

In a first embodiment, a first predefinable plane is defined by the extension direction of the polarization modification device and of the further mirror device. The third boundary surface runs perpendicularly to the first boundary surface and to the second boundary surface. In this case, the first predefinable plane is chosen in such a way that the second radiation reflected back by the further mirror device enters into the prism at the location at which it emerged from the prism. A small disadvantage of this embodiment is that the beam provided at the output of the prism is likewise inclined. For this reason, the first predefinable plane does not run parallel to the optical axis of the laser devices.

In a second embodiment, therefore, it is provided that a first predefinable plane is defined by the extension direction of the polarization modification device and of the further mirror device, wherein a second predefinable plane is defined by the third boundary surface. In this case, the first predefinable plane and the second predefinable plane are chosen in such a way that the second radiation emerging from the prism in the direction of the further mirror device and the second radiation reflected back by the further mirror device run perpendicularly to the optical axis of the first laser device and of the second laser device before entering into the prism. In other words, in this embodiment, the prism is arranged in an inclined fashion between the laser devices, which has the effect that the beam provided at the output A runs perpendicularly to the optical axis of the laser devices.

Re FIG. 1: in the projection device 10 illustrated in FIG. 1, the collimated laser beam of the respective laser device impinges on the flat boundary surface of the prism 16, as a result of which at least part of the radiation is reflected back into the respective laser device, to be precise on account of Fresnel losses at the surface. Given an unfavorable design of the axial distances of the respective laser device and the angle of the respective boundary surface of the prism, termination of the generation of radiation can occur.

Accordingly, particularly preferably, the fourth boundary surface also runs parallel to the third boundary surface, such that the output beam runs perpendicularly to the optical axis of the respective laser devices.

The exit surface angle of the prism on the side of the third boundary surface and/or on the side of the fourth boundary surface is preferably between 2° and 3°, in particular 2.3°. The absolute value of the difference between the predefinable angle not equal to 90°, said angle being formed by the first boundary surface of the prism with the optical axis of the first laser device, and 90° is between 0.1° and 1.5°, preferably between 0.6° and 1.5°. This formulation takes account of the circumstance that, in order to achieve the object, the prism can be tilted both in one direction and in the opposite direction.

Preferably, the polarization modification device is designed in such a way that the second radiation, after passing through the polarization modification device at least twice is polarized in such a way that it passes through the polarization-dependent mirror device substantially without reflection.

The polarization-dependent mirror device is preferably arranged in such a way that the second radiation, after first passage through the polarization modification device is specularly reflected at the further mirror device, subsequently passes through the polarization modification device a second time and, after the second passage, impinges on the polarization-dependent mirror device a second time.

Particularly preferably, the polarization modification device is an $n*\lambda/4$ plate, wherein n is odd, and in particular n=1. As a result, the polarization axis of the beam is rotated by 90° upon passing through the polarization modification device twice, for which reason the polarization-dependent mirror device at which the beam was previously reflected can now be passed through without reflection.

It is provided, in particular, that the second radiation, before it impinges on the polarization-dependent mirror device the second time, has a direction of polarization which is perpendicular to the first direction of polarization. In this way, by means of cross-polarized filter spectacles, the different beams can be fed to the respectively intended eye in a particularly simple manner.

The first direction of polarization can be an s-polarization, for example. In that case, the second radiation is preferably p-polarized before it impinges on the polarization-dependent mirror device the second time. Conversely, it can be provided that the first direction of polarization is a p-polarization. In that case, the second radiation is s-polarized before it impinges on the polarization-dependent mirror device the second time.

There, the presented projection device according to various embodiments can be designed for the monochrome representation and also for the colored representation of 3D images. While only a first and a second laser device have to be provided for the monochrome representation, n first laser devices and n second laser devices where n∈N have to be provided for colored representations. In this case, the respective i-th first laser device is arranged opposite the respective i-th second laser device, where i=1 to n. In this context, an i-th polarization-dependent mirror device is arranged between the i-th first laser device and the i-th second laser device, where i=1 to n. The i-th first laser device and the i-th second laser device are particularly designed to emit radiation in an i-th wavelength range, where i=1 to n.

In a particularly preferred embodiment, n=3, wherein the first wavelength range lies in the red spectrum, the second wavelength range lies in the green spectrum and the third wavelength range lies in the blue spectrum.

Overall, six laser devices are accordingly provided, which suffice for a very good colored representation of 3D images.

An optical device, in particular a lens, can be arranged between the respective laser device and the assigned polarization-dependent mirror device. It is ensured in this way that virtually the entire output power of the respective laser diode is available for the representation of the 3D images. Such a device is distinguished by an excellent efficiency.

The preferred embodiments presented with regard to a projection device according to various embodiments and the advantages of said embodiments correspondingly hold true, insofar as applicable, for the method according to various embodiments.

It goes without saying that the described projection device according to the present disclosure can be supplemented by further laser devices that need not have a laser device arranged opposite them. With such additional, individually positioned laser devices, for example blue-emitting laser devices, specific spectral ranges, for example blue, can be amplified in terms of intensity.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

The following detailed description refers to the accompanying drawing that show, by way of illustration, specific details and embodiments in which the disclosure may be practiced.

Figure 1:
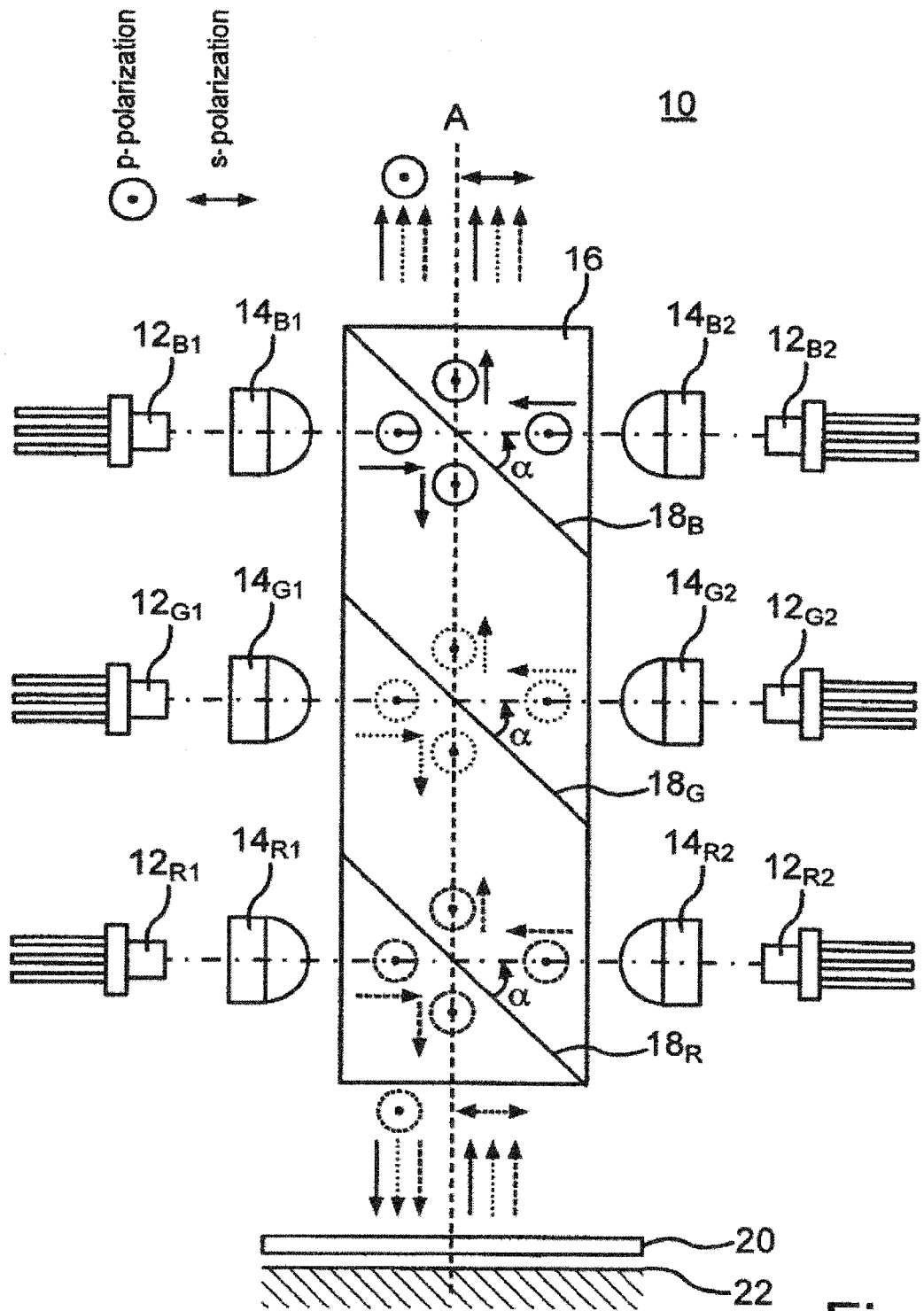
FIG. 1 shows in schematic illustration a projection device described in the application having the internal file reference 201117170 in the name of the applicant of the present application.
Figure 2:
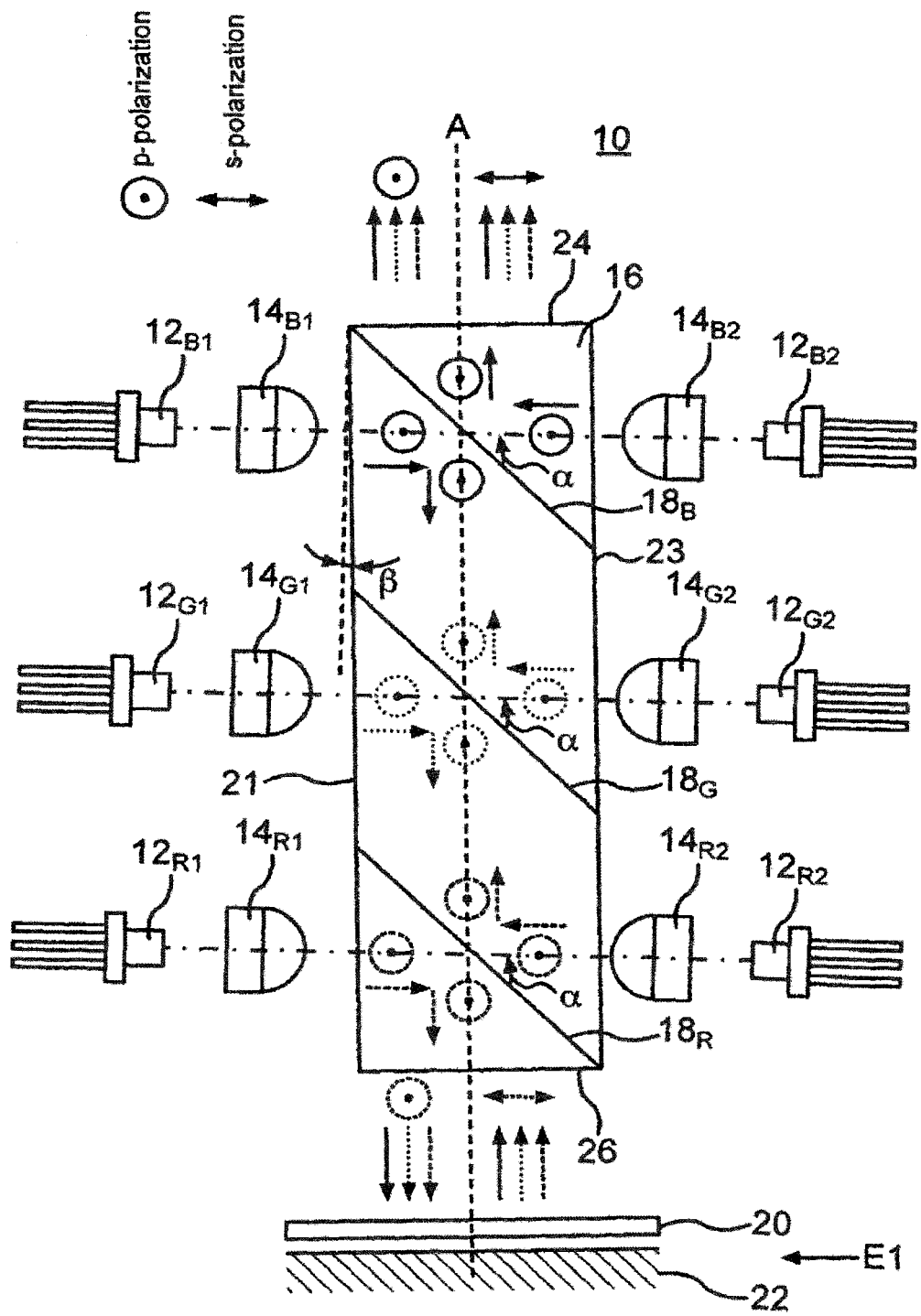
FIG. 2 shows in schematic illustration a first embodiment of a projection device according to various embodiments.
Figure 3:
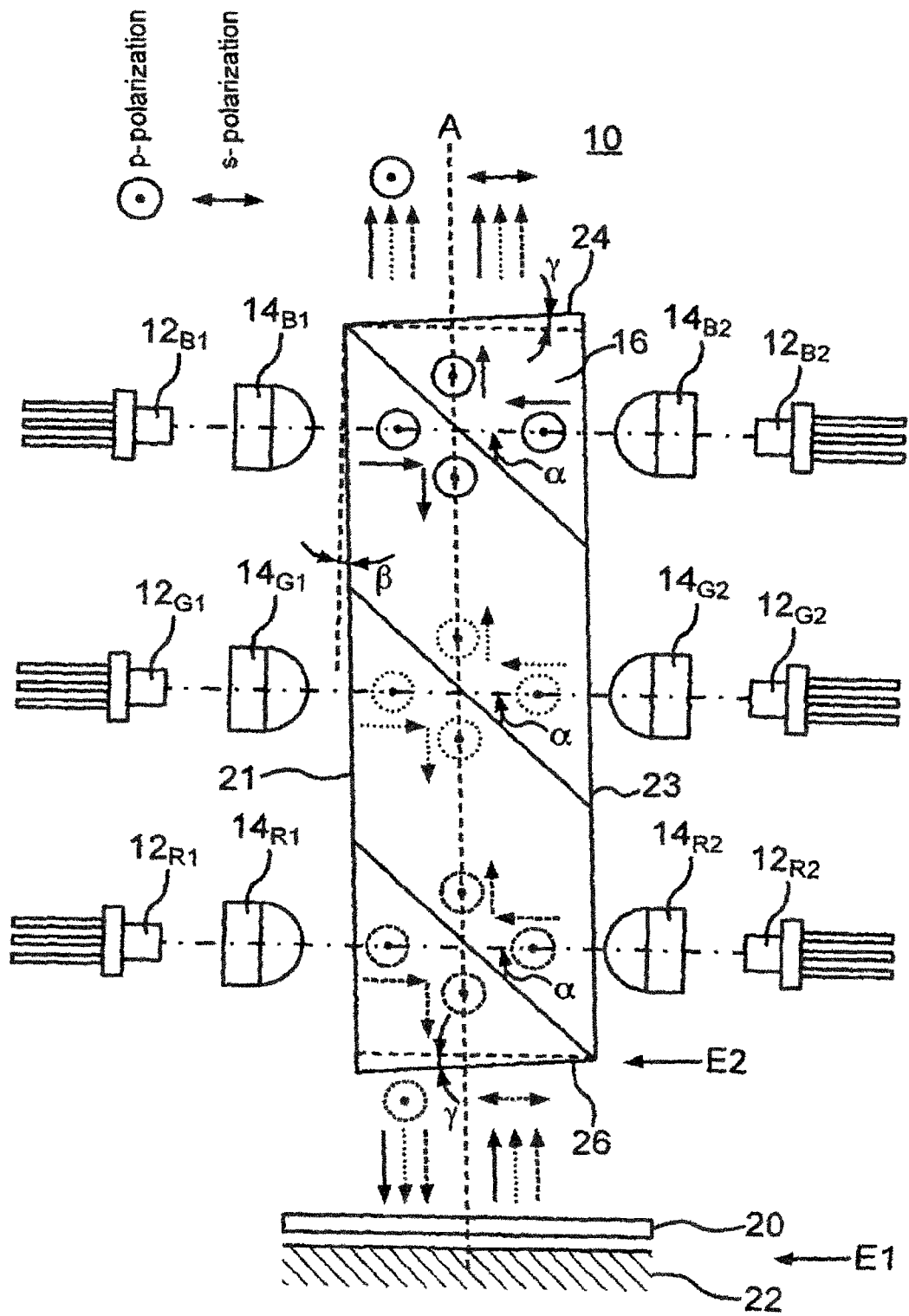
FIG. 3 shows in schematic illustration a second embodiment of a projection device according to various embodiments.

The reference signs introduced with reference to FIG. 1 will continue to be used for the embodiments of the present disclosure as illustrated in FIGS. 2 and 3, insofar as they relate to identical and identically acting components.

In the case of the embodiment of a projection device according to the present disclosure as illustrated schematically in FIG. 2, the prism 16 is arranged in a tilted manner, i.e. with an angle not equal to 90° between the laser devices 12. Compared with the orientation of the prism 16 in the projection device 10 illustrated in FIG. 1, the prism 16 is inclined by an angle β, wherein β is preferably up to 1.5°, and in particular is equal to 0.6°. The boundary surface 21 of the prism 16 facing the laser devices having the index "1" therefore no longer forms an angle of 90° but rather forms an angle not equal to 90° with the optical axis of said laser devices. The same applies to the boundary surface 23 opposite the laser devices having the index "2".

In the embodiment as illustrated in FIG. 2, the boundary surfaces 24 and 26 are arranged perpendicularly to the boundary surfaces 21 and 23. The beam emerging from the prism 16 in the direction of the λ/4 retardation plate 20 and the mirror device 22 therefore forms an angle not equal to 90° relative to the optical axis of the respective laser devices. If a first predefinable plane E1 is defined by the extension direction of the λ/4 retardation plate 20 and of the further mirror device 22, then the plane does not run parallel to the optical axis of the laser devices 12, but rather such that the radiation reflected back by the further mirror device 22 enters into the prism 16 at the location at which it emerged from the prism 16.

In the embodiment illustrated in FIG. 3, the boundary surfaces 24 and 26 are not arranged perpendicularly to the boundary surfaces 21 and 23. Rather, they form a so-called exit surface angle γ relative to the perpendicular orientation depicted by dashed lines (cf. FIG. 2). Said angle γ (exit surface angle) assumes the value of 2.32° in one exemplary embodiment for a tilting angle β of 0.6° and a refractive index n of the glass used for the prism 16 of 1.52. The beams emerging on both sides of the prism 16 run perpendicularly to the optical axis of the laser devices 12. A second predefinable plane E2 is defined by the boundary surface 26.

Generally, the following relationship applies to the exit surface angle γ:

$$\sin(\gamma - \arcsin((\sin\beta)/n)) = (\sin(\beta+\gamma)) \cdot (1/n),$$

wherein β is the tilting angle of the prism 16, n is the refractive index of the glass and γ is the exit surface angle sought.

The refractive index n is 1.52 for glass having the designation BK7.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. A projection device comprising:
   at least one first laser device for emitting a first radiation having a first direction of polarization; and
   at least one second laser device for emitting a second radiation having the first direction of polarization;
   wherein the first laser device and the second laser device are arranged opposite one another,
   wherein the projection device further comprises:
   a prism arranged between the first laser device and the second laser device and having a first boundary surface facing the first laser device and a second boundary surface facing the second laser device,
   wherein at least one polarization-dependent mirror device is arranged in the prism and is designed in such a way that radiation having the first direction of polarization (s; p) is reflected after impinging on the polarization-dependent mirror device, wherein the polarization-dependent mirror device is arranged between the first laser device and the second laser device in such a way that the first radiation and the second radiation run oppositely to one another after reflection at the polarization-dependent mirror device;
   at least one polarization modification device wherein the polarization modification device is designed to modify the direction of polarization of radiation in such a way that it passes through the polarization-dependent mirror device without reflection; and
   at least one further mirror device;
   wherein the polarization modification device and the further mirror device are arranged in the beam path of the second radiation after a first and before a second impingement on the polarization-dependent mirror device,
   wherein the first boundary surface of the prism forms a predefinable angle not equal to 90° with the optical axis of the first laser device and the second boundary surface of the prism runs parallel to the first boundary surface.

2. The projection device as claimed in claim 1, wherein the prism has a third boundary surface, which faces the polarization modification device and the further mirror device, and also a fourth boundary surface which constitutes the output of the projection device.

3. The projection device as claimed in claim 2, wherein a first predefinable plane is defined by the extension direction of the polarization modification device and of the further mirror device,
   wherein the third boundary surface runs perpendicularly to the first boundary surface and to the second boundary surface,
   wherein the first predefinable plane is chosen in such a way that the second radiation reflected back by the further mirror device enters into the prism at the location at which it emerged from the prism.

4. The projection device as claimed in claim 2, wherein a first predefinable plane is defined by the extension direction of the polarization modification device and of the further mirror device,
   wherein a second predefinable plane is defined by the third boundary surface,
   wherein the first predefinable plane and the second predefinable plane are chosen in such a way that the second radiation emerging from the prism in the direction of the further mirror device and the second radiation reflected back by the further mirror device run perpendicularly to the optical axis of the first laser device and of the second laser device before entering into the prism.

5. The projection device as claimed in claim 4, the fourth boundary surface runs parallel to the third boundary surface.

6. The projection device as claimed in claim 4, wherein the exit surface angle of the prism on the side of the third boundary surface and/or on the side of the fourth boundary surface is between 2° and 3°.

7. The projection device as claimed in claim 1,
wherein the absolute value of the difference between the predefinable angle and 90° is between 0.1° and 1.5°.

8. The projection device as claimed in claim 1,
wherein the polarization modification device is designed in such a way that the second radiation, after passing through the polarization modification device at least twice is polarized in such a way that it passes through the polarization-dependent mirror device without reflection.

9. The projection device as claimed in claim 1,
wherein the polarization-dependent mirror device is arranged in such a way that the second radiation, after first passage through the polarization modification device is specularly reflected at the further mirror device, subsequently passes through the polarization modification device a second time and, after the second passage, impinges on the polarization-dependent mirror device a second time.

10. The projection device as claimed in claim 1,
wherein the polarization modification device is an n*lambda/4 plate, wherein n is odd.

11. The projection device as claimed in claim 1,
wherein the second radiation, before it impinges on the polarization-dependent mirror device the second time, has a direction of polarization which is perpendicular to the first direction of polarization.

12. The projection device as claimed in claim 11,
wherein the first direction of polarization is an s-polarization.

13. The projection device as claimed in claim 11,
wherein the second radiation is p-polarized before it impinges on the polarization-dependent mirror device the second time.

14. The projection device as claimed in claim 11,
wherein the first direction of polarization is a p-polarization.

15. The projection device as claimed in claim 11,
wherein the second radiation is s-polarized before it impinges on the polarization-dependent mirror device the second time.

16. The projection device as claimed in claim 1,
wherein the projection device comprises:
n first laser devices, where n∈N;
n second laser devices where n∈N;
wherein the respective i-th first laser device is arranged opposite the respective i-th second laser device, where i=1 to n.

17. The projection device as claimed in claim 16,
an i-th polarization-dependent mirror device is arranged between the i-th first laser device and the i-th second laser device, where i=1 to n.

18. The projection device as claimed in claim 16,
wherein the i-th first laser device and the i-th second laser device are designed to emit radiation in an i-th wavelength range, where i=1 to n.

19. The projection device as claimed in claim 18,
wherein n=3, wherein the first wavelength range lies in the red spectrum, the second wavelength range lies in the green spectrum and the third wavelength range lies in the blue spectrum.

20. The projection device as claimed in claim 1,
wherein an optical device is arranged between the respective laser device and the assigned polarization-dependent mirror device.

21. A method for operating a projection device comprising at least one first laser device for emitting a first radiation having a first direction of polarization and at least one second laser device for emitting a second radiation having the first direction of polarization,
the method comprising:
providing a prism having at least one polarization-dependent mirror device which is designed to reflect radiation having the first direction of polarization;
arranging the polarization-dependent mirror device between the first laser device and the second laser device in such a way that the first radiation and the second radiation run oppositely to one another after reflection at the polarization-dependent mirror device;
modifying the direction of polarization of the second radiation in such a way that it can pass through the polarization-dependent mirror device without reflection; and
guiding the second radiation having a modified direction of polarization onto the polarization-dependent mirror device in such a way that after passing through the polarization-dependent mirror device it runs parallel to the first radiation after reflection at the polarization-dependent mirror device,
wherein the prism is arranged between the first laser device and the second laser device in such a way that the first boundary surface of the prism forms a predefinable angle not equal to 90° with the optical axis of the first laser device and the second boundary surface of the prism runs parallel to the first boundary surface.

* * * * *